April 20, 1926.

H. E. BLOMGREN

VALVE DEVICE

Original Filed August 26, 1920

1,581,778

Inventor
Henry E Blomgren
By his Attorney
Wm H Reid

Patented Apr. 20, 1926.

1,581,778

UNITED STATES PATENT OFFICE.

HENRY E. BLOMGREN, OF BROOKLYN, NEW YORK.

VALVE DEVICE.

Application filed August 26, 1920, Serial No. 406,189. Renewed December 12, 1924.

*To all whom it may concern:*

Be it known that I, HENRY E. BLOMGREN, a native of Sweden, who has applied for citizenship of the United States of America, and a resident of Brooklyn, county of Kings, and State of New York, have invented certain new and useful Improvements in Valve Devices, of which the following is a specification.

This invention relates to a special form of valve, including its valve seat, and is designed for use particularly to the form of valves known as poppet valves, that are moved upwardly from the seat and then returned to engage the valve seat and which two members have an annular engagement face or portion.

The object of this invention is to provide an improved form or configuration of the valve seating portion and further to provide an improved form of this face of the cooperating valve seat, whereby the two members will maintain engagement throughout the annular valve engaging portions not only when first put into use but for a long period thereafter, and such proper engagement will not be interfered with by the regular or irregular wear on one or both of these surfaces.

In the accompanying drawing showing one embodiment of my invention,

Heretofore, most valves of this character are provided with a substantially conical periphery of about an angle of forty-five degrees to the face of the valve. The valve seat is provided with a similar face whereby the two members theoretically at least will engage throughout practically the entire area of the periphery and the valve seat. With such valves, a slight lateral movement of the valve stem in its guide portion will deteriorate the alinement and will tend to seat only partially and an opening between the members is provided permitting the escape of the charge in the cylinder, or else an inlet into the cylinder during exhaust stroke. Another cause of such trouble is various particles getting between the valve and its seat. Another objection is that when such valve seat begins to wear away a ledge is formed that will permit escape of the gases.

To overcome this difficulty I have provided a form of valve in which the edge is made convex towards the valve seat and this structure as set forth, I find gives the best result when such curves considered in sections are comparatively flat.

Figure 2:
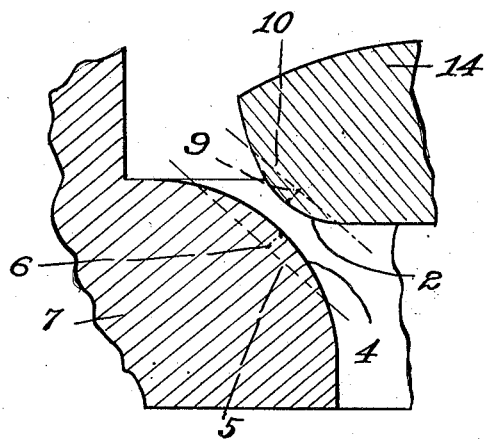
Fig. 2 is a similar section enlarged at the meeting portions at the valve and valve seat members.

In the arrangement shown in the drawing 7 represents portion of a motor such as an internal combustion engine, having the usual water jacket, and an inlet port, at which is a valve seat 15. A valve 14, with a valve stem 13, slides in a guide 12, is arranged to control this port, and engages the valve seat 15 at its periphery. This valve 14 has its edge or periphery in the form of a curve, convex towards the valve seat, as shown in the drawing. Such curve is preferably a circular arc 2, whose chord 10 forms an angle of (45°) forty-five degrees with the top face of the valve. The arc or curve 2 that is subtended by the chord 10 has its altitude, indicated by line 9, much smaller than length of the chord 10, as indicated by the enlarged section in Fig. 2. This will produce a comparatively flat curve.

The valve seat 15 in the block or portion 7 has preferably a form of similar configuration. In section it comprises a curve or arc 4 of a circular form, whose chord 5 is much greater than the altitude 6 of the arc 4, and the chord 5 preferably makes an angle of about (45°) forty-five degrees with the outer face of the block.

Figure 1:
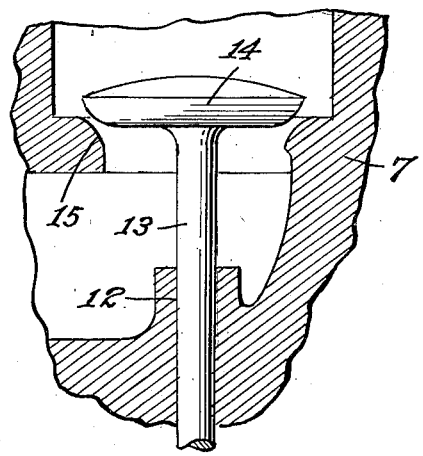
Figure 1 is an axial section through a motor embodying the valve and valve seat and adjacent parts.

These two members are relatively arranged so that when the valve seats, its intermediate, portion half way between the ends of the curve makes contact. The valve seat is also preferably arranged to engage the valve at the middle portion of the valve or arc as indicated in Fig. 1.

It will be understood that the valve relative to its seat will have a kind of rocking or universal movement upon any lateral movement of the valve stem in its guide. At first these two valve members will engage on a circular line. This zone of wear from use will simply increase to a small band, but no shoulders or sharp edges will be produced in either of these zones as would be the case with the old form of valve. This will serve to maintain engagement throughout the entire circumference of these members under all circumstances.

What I claim is:

1. In an internal combustion engine, a lift or poppet valve having a convexly shaped face in combination with a valve seat of convex formation, whereby said valve and seat may accommodate each other for wear, for improper alignment, and for distortion due to temperature changes.

2. In an internal combustion engine, the combination with a valve seat having a curved conformation, of a valve adapted to seat within said valve seat and having a curved conformation, said valve and seat having contact substantially only along a line, whereby said valve and seat may accommodate each other for wear, for improper alignment and for distortion due to temperature changes.

In testimony whereof, I have signed my name to this specification this 18th day of August, 1920.

HENRY E. BLOMGREN.